(12) United States Patent
McCafferty et al.

(10) Patent No.: US 6,491,349 B2
(45) Date of Patent: Dec. 10, 2002

(54) IN-SERVICE/OUT-OF-SERVICE ROTATABLE TAILGATE ASSEMBLY

(76) Inventors: Michael V. McCafferty, 618 Country Club La., Pekin, IL (US) 61554; Philip T. Brinkman, 1116 Elm St., Canton, IL (US) 61520

( * ) Notice: Subject to any disclaimer, the term of this patent is extended or adjusted under 35 U.S.C. 154(b) by 13 days.

(21) Appl. No.: 09/731,691

(22) Filed: Dec. 6, 2000

(65) Prior Publication Data

US 2002/0067065 A1 Jun. 6, 2002

(51) Int. Cl.$^7$ ................................................ B60P 1/22
(52) U.S. Cl. ............................ 298/23 DF; 298/23 MD; 298/23 F; 298/23 D
(58) Field of Search ...................... 298/23 MD, 23 F, 298/23 D, 23 DF; 296/56

(56) References Cited

U.S. PATENT DOCUMENTS

| | | | |
|---|---|---|---|
| 2,439,585 A | * | 4/1948 | Snow .................... 298/23 MD |
| 3,272,552 A | | 9/1966 | Park |
| 3,720,446 A | | 3/1973 | Kelly |
| 3,751,112 A | | 8/1973 | Hagenbuch |
| 3,905,493 A | | 9/1975 | Logue |
| 3,905,616 A | | 9/1975 | Tamburino et al. |
| 3,917,343 A | | 11/1975 | Taylor et al. |
| 4,050,734 A | | 9/1977 | Richard |
| 4,071,277 A | | 1/1978 | Stedman |
| 4,323,279 A | | 4/1982 | Domes et al. |
| 4,348,055 A | | 9/1982 | Meisner et al. |
| 4,531,781 A | | 7/1985 | Hunt et al. |
| 4,621,858 A | | 11/1986 | Hagenbuch |
| 4,678,235 A | | 7/1987 | Hagenbuch |
| 5,100,279 A | | 3/1992 | Bjerk |
| 5,174,632 A | | 12/1992 | Hagenbuch et al. |
| 5,228,750 A | | 7/1993 | Hagenbuch |
| 5,474,363 A | * | 12/1995 | Hagenbuch ................ 298/23 R |
| 5,503,462 A | * | 4/1996 | Capps et al. .............. 298/23 R |
| 5,887,914 A | | 3/1999 | Hagenbuch |

FOREIGN PATENT DOCUMENTS

| | | |
|---|---|---|
| CH | 98789 | 4/1940 |
| DE | 913876 | 6/1954 |
| GB | 595516 | 12/1947 |

OTHER PUBLICATIONS

Maxter Industries Ltd.; brochure entitled "ATLAS Automatic Elevating Tailgates" sCopyright 1993; 2 pages.
Maxter Industries Ltd.; pages from website http://maxter-atlas.com, entitled "Products", and "Maxter's Origin–History and Growth"; applicants first became aware of this material on May 22, 2001.; 7 pages.

* cited by examiner

Primary Examiner—Stephen T. Gordon
(74) Attorney, Agent, or Firm—Leydig, Voit & Mayer, Ltd.

(57) ABSTRACT

An improved tailgate assembly for a truck body is provided. The tailgate assembly including a gate portion that is pivotally supported between a pair of opposing side beams for movement relative to the side beams between an operative and an inoperative position. Each of the side beams is pivotally attached to a respective side wall of the dump body such that the side beams and gate are movable relative to the truck body between an in-service, closed position wherein the gate portion encloses a rear end of the dump body and an out-of-service position wherein the gate portion is positioned adjacent a forward end of the dump body. The assembly also including a pivoting assembly for moving the gate portion between the operative and inoperative positions. The pivoting assembly is actuated as the side beams carry the gate portion to the out-of-service position and operable to pivot the gate portion relative to the side arms toward the forward end of the dump body from the operative to the inoperative position.

14 Claims, 10 Drawing Sheets

IN-SERVICE/OUT-OF-SERVICE ROTATABLE TAILGATE ASSEMBLY

FIELD OF THE INVENTION

This invention generally relates to heavy-duty off-road trucks and, more particularly, to a tailgate assembly for these trucks.

BACKGROUND OF THE INVENTION

Certain working environments, such as coal mines, can require the use of rear dump off-road trucks to haul loads having different material densities. Since the optimal volumetric capacity for a truck body varies based on the density of the material to be hauled, such hauling operations can be difficult to conduct efficiently. For example, in the case of a coal mine, off-road trucks may be used to haul both coal, which has a relatively lighter density, and overburden (i.e. the earth otherwise removed in a coal mining operation), which has a relatively heavier density. If the heavier density overburden is hauled in trucks having bodies with a volumetric capacity designed to haul coal, the load can substantially exceed the gross vehicle weight rating of the truck if the body is filled to capacity. Conversely, if a truck having a relatively smaller body designed to haul overburden is used to haul coal, the load of lighter weight coal will not come close to reaching the maximum allowable payload capacity of the truck.

One way in which to address this issue is to provide a group of trucks, with relatively larger dump bodies, which are dedicated to hauling coal and a separate group of trucks, which have relatively smaller dump bodies, dedicated to hauling overburden. However, having trucks which are exclusively dedicated to hauling one particular material substantially reduces the overall truck fleet flexibility.

In order to permit off-road trucks used in working environments such as coal mines to be used in a more flexible manner, the dump bodies can be equipped with a selectively deployable tailgate assembly which can be used to adjust the volumetric capacity of the dump body. In particular, the dump body of the truck can be equipped with a tailgate assembly rotatable between a closed, in-service position at the rear of the truck body and an out-of-service position at the front of the truck body. With such a tailgate assembly, to increase the effective volumetric capacity of the truck body for hauling relatively lighter density material such as coal, the truck can be loaded with the tailgate in the closed, in-service position. Arranging the tailgate at the rear of the truck body increases the effective volumetric capacity of the truck body by preventing material from spilling out of the rear of the truck body. To lower the effective volumetric capacity of the truck body for hauling relatively heavier density material such as overburden, the truck can be loaded with the tailgate in the out-of-service position. When the tailgate is arranged in the out-of-service position at the front of the truck body, excess material loaded into the dump body will spill out of the open rear end of the body thereby minimizing the risk of overloading the truck body with the heavier overburden material.

Accordingly, such selectively deployable tailgate assemblies allow the effective volumetric capacity of a truck body to be selectively adjusted to permit a truck to efficiently haul loads of different volumes and material densities. As will be appreciated, the ability to selectively adjust the volumetric capacity of the dump body eliminates the need to provide differently sized trucks for hauling lighter density materials and heavier density materials.

One problem with such tailgate assemblies, however, is that when the tailgate is in the out-of-service position it can pose an obstacle to the loading operation. More specifically, when the tailgate is in the out-of-service position, the center rear portion of the tailgate, which extends between the two tailgate side beams, is oriented such that it extends upward and towards the rear end of the dump body overhanging the open top of the dump body. In this position, as material is being loaded into the dump body, the center rear portion of the tailgate is susceptible to being struck by the loading equipment or possibly by the actual material being loaded into the body. This can result in significant damage to the tailgate assembly necessitating costly repairs or even replacement. Moreover, the impact of a collision with the tailgate potentially could also damage the loading equipment.

OBJECTS AND SUMMARY OF THE INVENTION

Accordingly, in view of the foregoing, a general object of the present invention is to provide a dump body for a heavy-duty, off-road truck having a selectively deployable tailgate assembly which enables the truck to efficiently haul loads of varying volumes and material densities.

A more specific object of the present invention is to provide a dump body for a heavy-duty, off-road truck having a selectively deployable tailgate which minimizes potential interference with the loading of heavier density material into the dump body.

A related object of the invention is to provide a tailgate assembly as characterized above which minimizes the risk of damage to the tailgate assembly and dump body caused by possible over loading of heavier density material into the dump body/onto the rear dump off road truck.

Another object of the invention is to provide a tailgate assembly as characterized above which provides controlled and consistent movement of the tailgate assembly between in-service and out-of-service positions.

These and other features and advantages of the invention will be more readily apparent upon reading the following description of a preferred exemplary embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
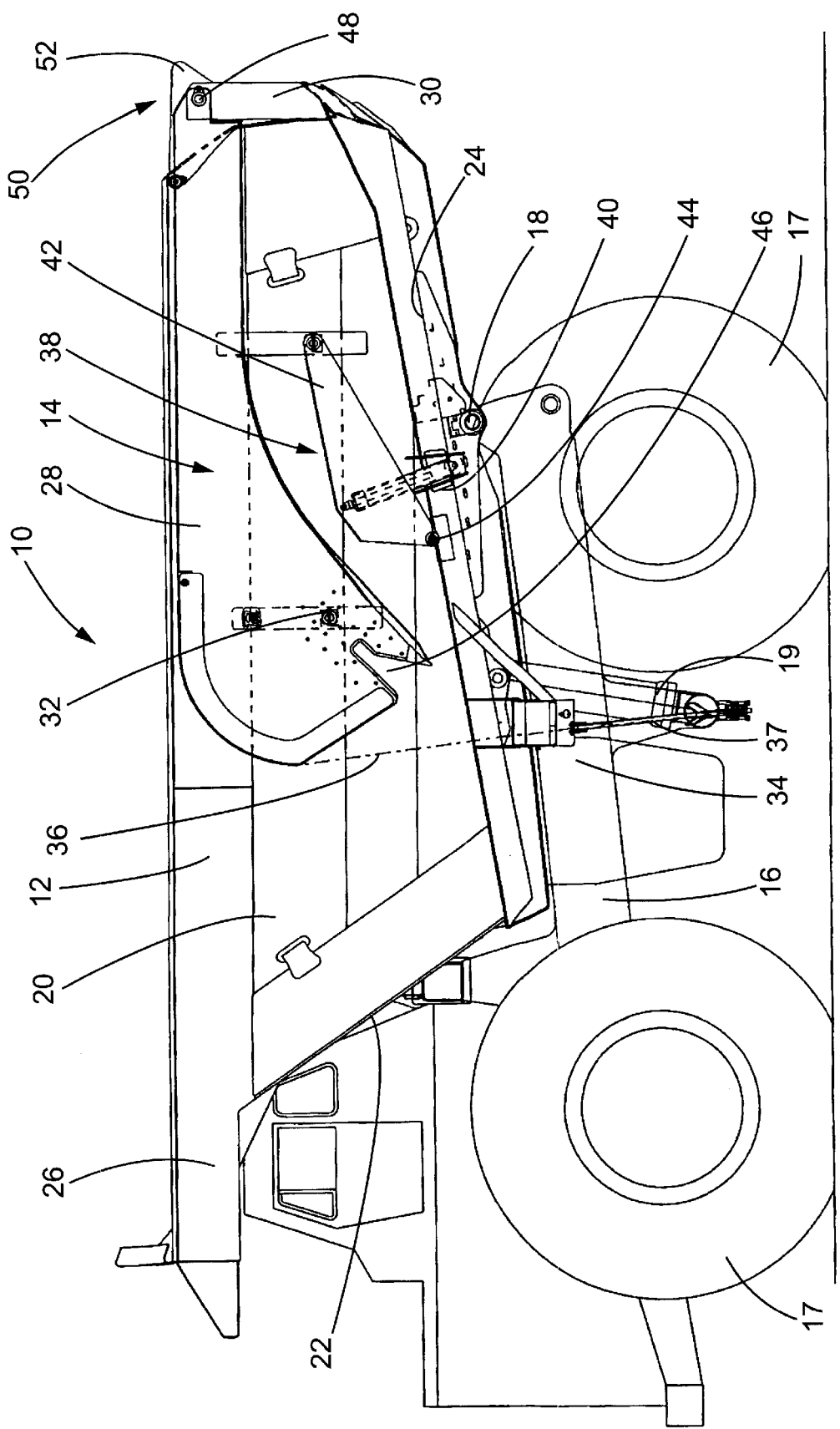
FIG. 1 is a side view of a heavy-duty, off-road truck showing the dump body in the lowered position and an illustrative tailgate assembly constructed in accordance with the present invention in the in-service, closed position.

Referring now more particularly to FIG. 1 of the drawings there is shown an illustrative heavy-duty off-highway truck 10 having a dump body 12 and a tailgate assembly 14 constructed in accordance with the teachings of the present invention. The truck 10 includes a chassis 16 which is supported on a plurality of tires 17 and to which the dump body 12 is attached for pivotal movement about an axis 18 between a lowered position (FIG. 1) for receiving and transporting a load of light density material and a raised position (FIG. 2) for dumping the load. In the illustrated embodiment, the dump body 12 is moved between the lowered and raised positions by actuation of a hydraulic dump cylinder 19 carried on the chassis 16 of the truck 10. The dump body 12 is generally constructed of steel panels which define the shape of the dump body and beams which form the structural framework for the dump body.

In this case, the dump body 12 comprises a pair of opposing sidewalls 20, a front wall 22 (or front slope) and a floor 24. The dump body 12 further includes a canopy 26 which is integrally connected to the top end of the front wall 22 and extends over the cab of the truck 10. The illustrated tailgate assembly includes a pair of laterally spaced, parallel side beams 28 between which a center rear portion 30 of the tailgate is supported. Each side beam 28 is pivotally connected to a respective one of the sidewalls 20 of the dump body 12 by a pivot pin 32 so as to allow the side beams to rotate relative to the dump body 12.

In the illustrated embodiment, the truck 10 is generally symmetrical about its longitudinal axis. Accordingly, as will be appreciated, many of the elements identified in the side views of FIGS. 1–10 have complementary elements arranged on the opposite side of the truck 10. For ease of references herein, the present invention will only be described in connection with the side of the truck shown in FIGS. 1–10. However, it will be appreciated that in one embodiment of the invention complementary elements are provided on the side of the truck that is not shown.

Figure 2:
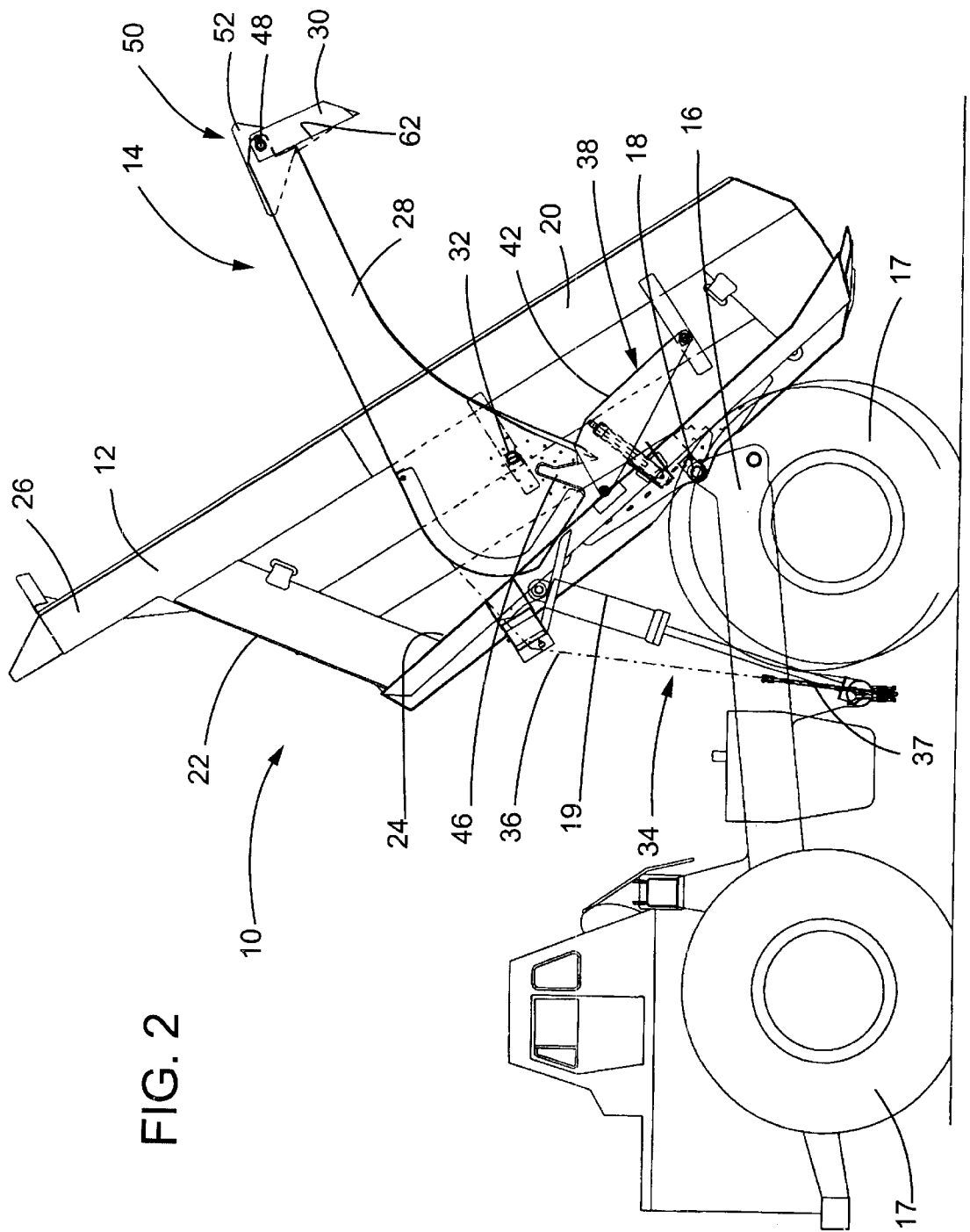
FIG. 2 is a side view of the heavy-duty, off-road truck of FIG. 1 showing the dump body in the raised position and the tailgate assembly in the in-service, open position.
Figure 5:
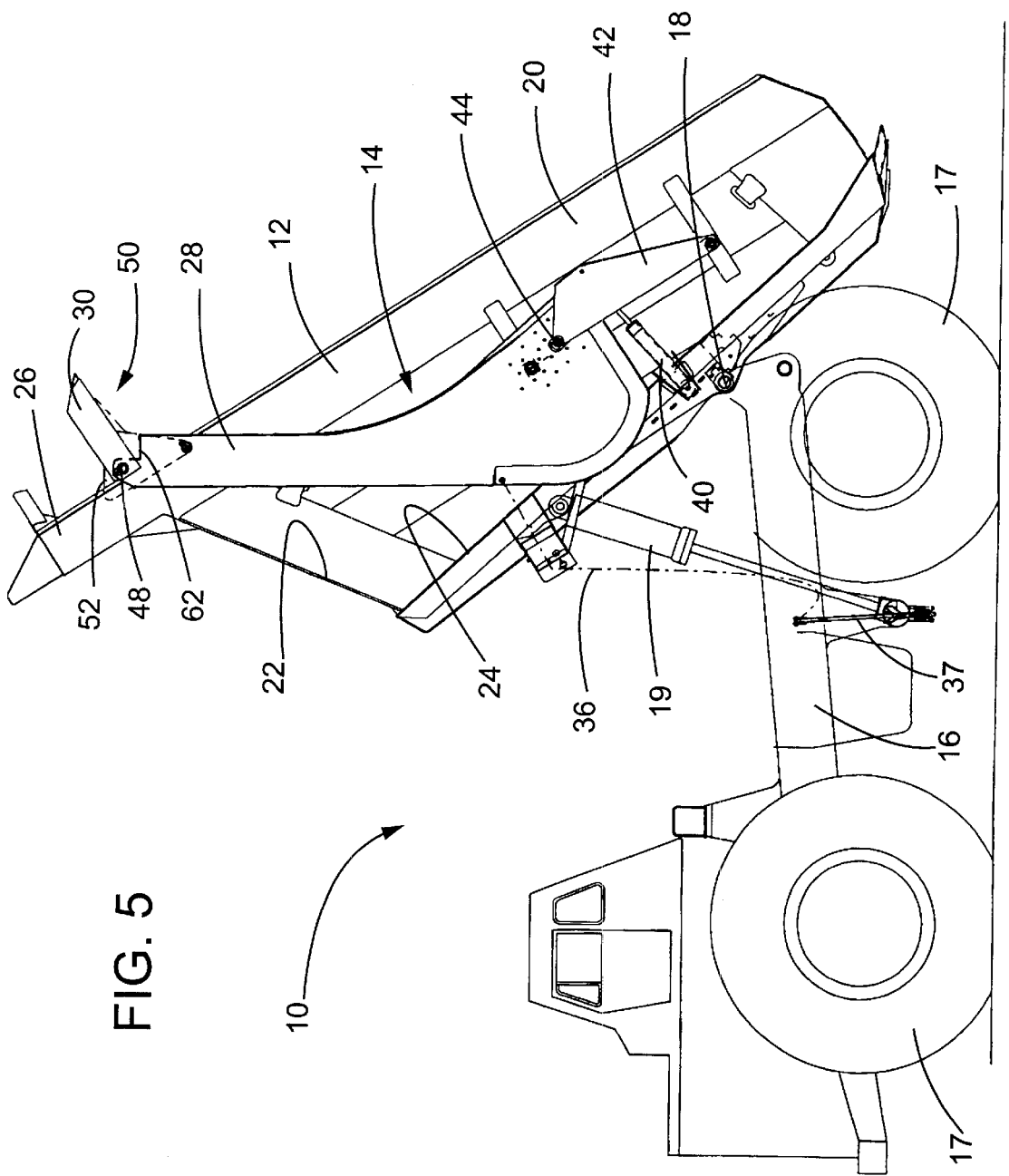
FIG. 5 is a side view of the heavy-duty, off-road truck of FIG. 1 showing the dump body in the raised position and the tailgate assembly in the out-of-service position with the center rear portion of the tailgate in its inoperative position.
Figure 6:
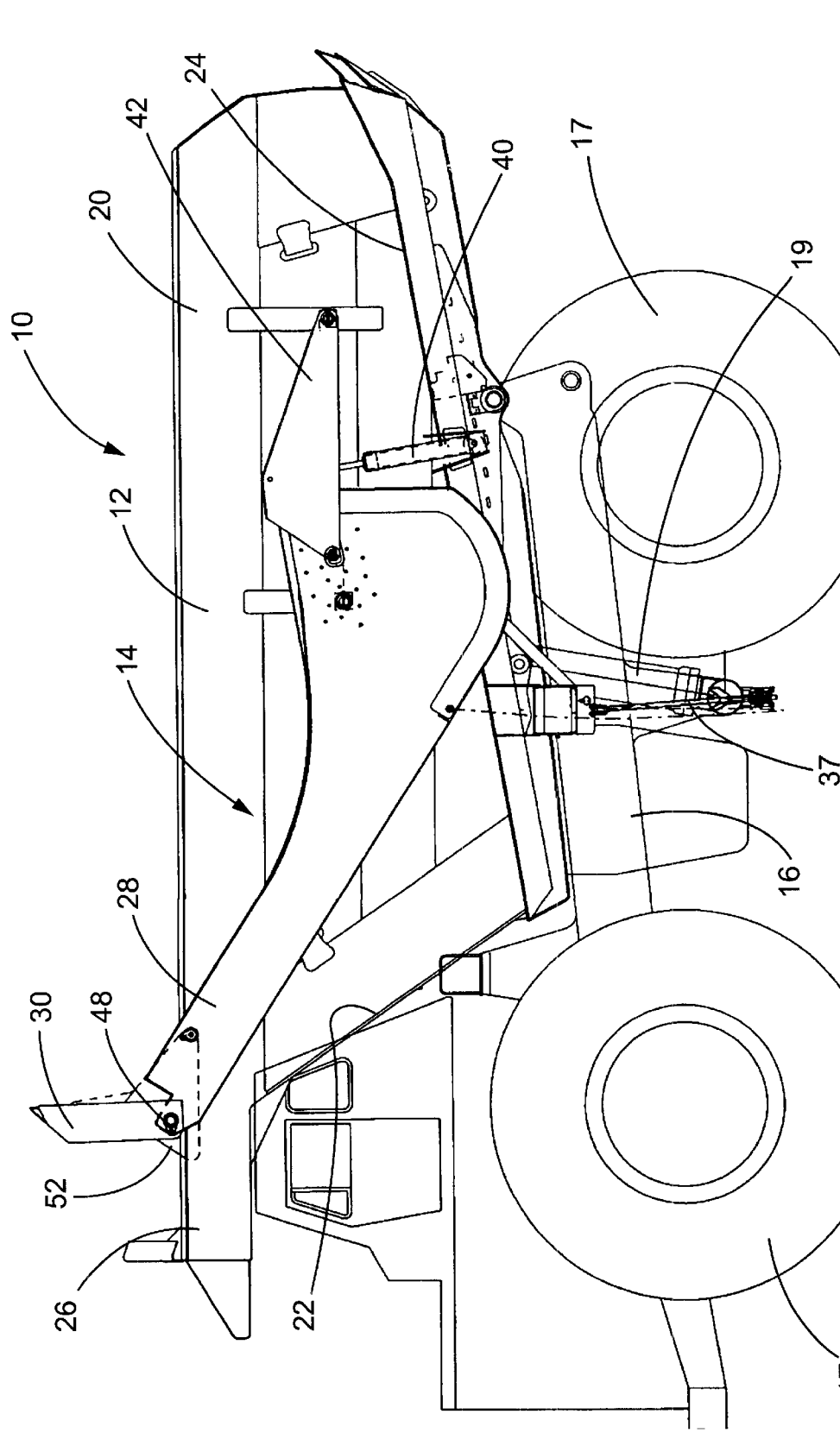
FIG. 6 is side view of the heavy-duty, off-road truck of FIG. 1 showing the dump body in the lowered position and the tailgate assembly in the out-of-service position with the center rear portion of the tailgate in its inoperative position.

To permit the effective volumetric capacity of the dump body 12 to be selectively adjusted to accommodate loads of different material densities, the tailgate assembly 14 is movable relative to the dump body between an in-service, closed position (FIG. 1) and an out-of-service position (FIGS. 5 and 6). In the in-service closed position, the tailgate assembly 14 is in a lowered position with the center rear portion 30 of the tailgate extending between the opposing sidewalls 20 and, when being loaded, closing off the rear end of the dump body 12 as shown in FIG. 1. With the rear end of the dump body 12 closed off, the volumetric capacity of the dump body is increased for more efficient hauling of lighter density material such as coal. In the out-of-service position, the tailgate assembly 14 is in a resting position with the center rear portion 30 of the tailgate arranged on the canopy 26 of the dump body 12 thereby opening up the rear end of the dump body as shown in FIGS. 5 and 6. Thus, the dump body 12 can be quickly and easily converted to a lower effective volumetric capacity for hauling relatively heavier density materials such as overburden, simply by moving the tailgate assembly 14 into the out-of-service position. Additionally, to facilitate rear dumping of lighter material when the dump body 12 is moved to the raised position, the tailgate assembly 14 moves into an in-service, open position as shown in FIG. 2 wherein the center rear portion 30 of the tailgate is pivoted upward relative to the rear end of the dump body into an intermediate position between the in-service, closed and out-of-service positions.

For moving the tailgate assembly 14 between the various positions, in the illustrated embodiment, two different tailgate actuation assemblies are provided. The first tailgate actuating assembly, generally referenced as 34, is responsible for rotating the tailgate assembly 14 between the in-service, closed (FIG. 1) and in-service, open (FIG. 2) positions. The first tailgate actuation 34 assembly comprises, in this instance, a cable or chain 36 and a solid link 37 that interconnects the truck chassis 16 and the side beam 28 of the tailgate assembly. The chain 36 and solid link 37 produce a torque on the tailgate assembly 14 that rotates the tailgate assembly between the in-service, closed (FIG. 1) and in-service, open (FIG. 2) positions as the hydraulic dump cylinder 19 pivots the dump body 12 between the raised and lowered positions.

Figure 3:
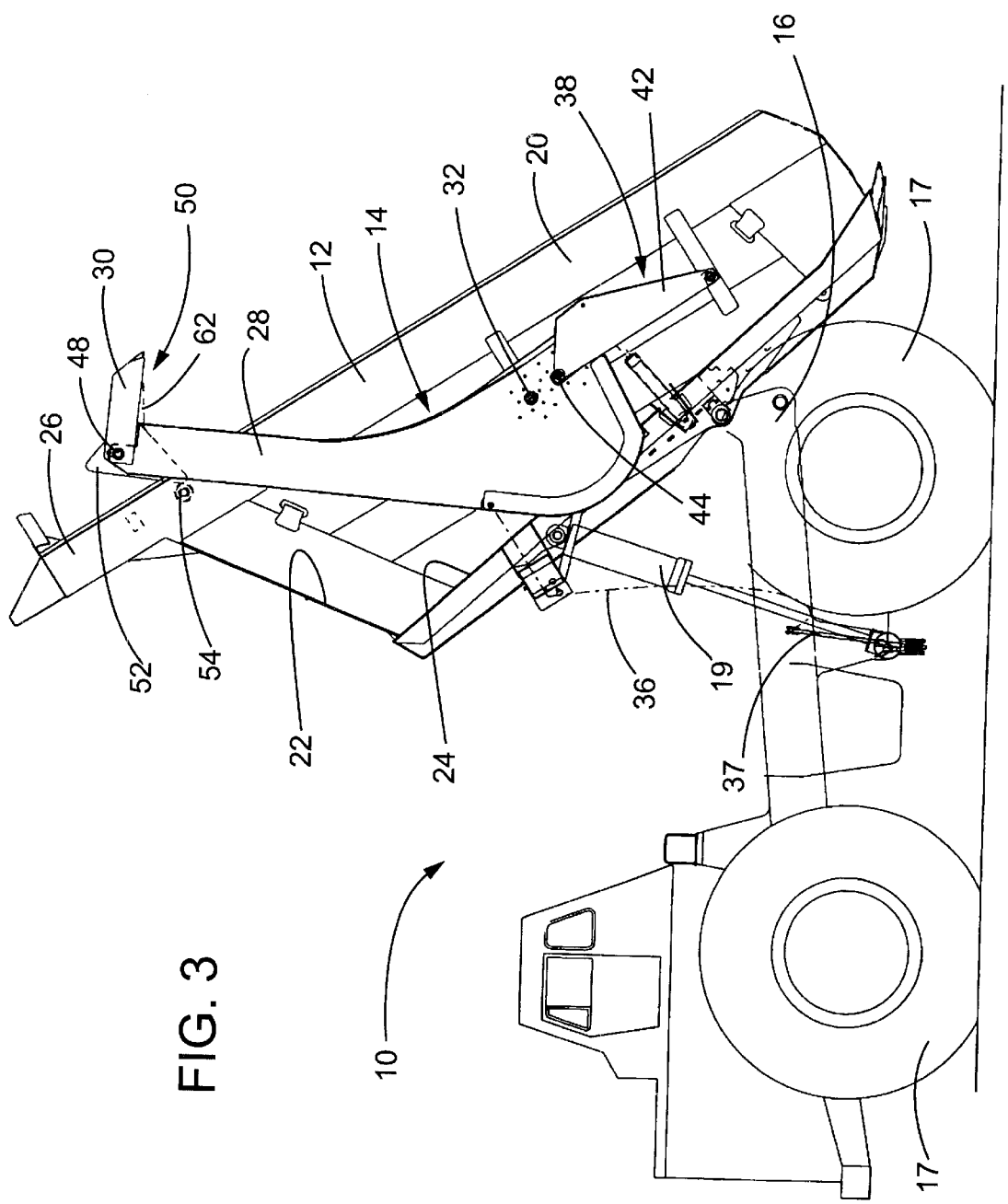
FIG. 3 is a side view of the heavy-duty, off-road truck of FIG. 1 showing the dump body in the raised position and the tailgate assembly approaching the out-of-service position.
Figure 4:
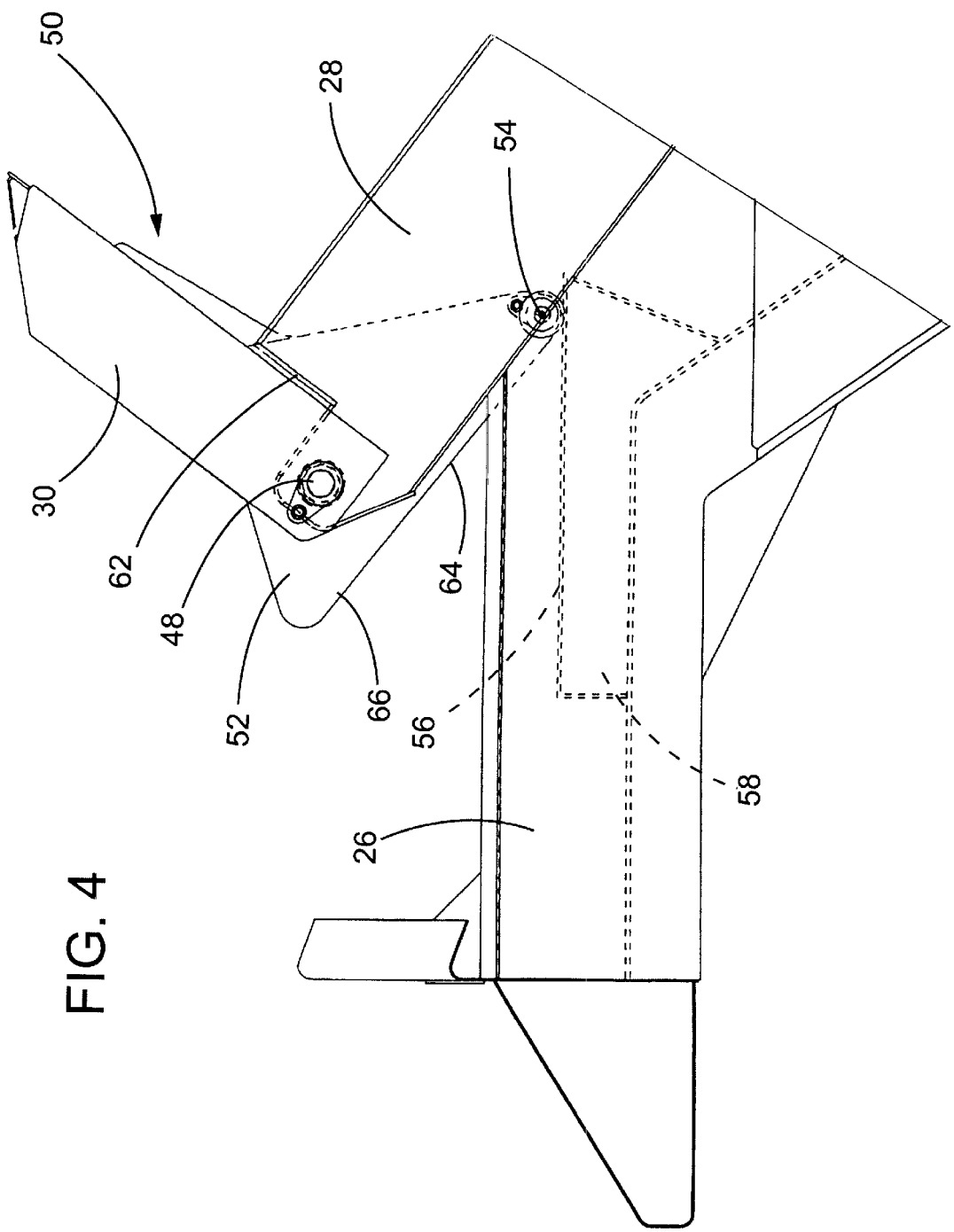
FIG. 4 is an enlarged partial side view of the heavy-duty, off-road truck of FIG. 1 showing the tailgate assembly approaching the out-of-service position with the center rear portion of the tailgate in the operative position.

The second tailgate actuation assembly, generally referenced as 38, is responsible for moving the tailgate assembly 14 between the in-service, open and out-of-service positions. In the illustrated embodiment, the second tailgate actuation assembly 38 comprises an actuating cylinder 40 having one end pivotally connected to the dump body 12 and the other end pivotally connected to a cam lever 42 as shown in FIGS. 2, 3 and 5. The cam lever 42, in turn, is connected to the dump body 12 via a pivot pin and includes a cam roller 44 which can be brought into engagement with a slot 46 disposed in the tailgate side beam 28 when the tailgate assembly is in the in-service, open position. Specifically, after the tailgate assembly 14 is rotated to the open, in-service position by the first tailgate assembly 34, the actuating cylinder 40 is extended so as to rotate the cam lever 42 and bring the cam roller 44 into initial engagement with the slot 46 as shown in FIG. 2. Further extension of the actuating cylinder 40 causes the cam lever 42 to rotate and the cam roller 44 to move within the slot 46 so as to produce a torque on the tailgate assembly 14 which rotates the tailgate assembly from the in-service, open position (FIG. 2) to the out-of-service position (FIGS. 3, 5 and 6). Once the tailgate assembly 14 reaches the out-of-service position, the engagement of the cam roller 44 with the slot 46 locks the tailgate assembly in place thereby preventing any unintentional and uncontrolled swinging movement of the tailgate back into the in-service, open position. Additional details regarding the actuation assemblies and the tailgate assembly are described in U.S. Pat. Nos. 5,474,363 and 5,887,914 the disclosure of which is incorporated herein by reference.

In accordance with one important aspect of the present invention, the tailgate assembly 14 is adapted such that when the tailgate is in the out-of-service position, the center rear portion 30 of the tailgate is positioned so as to minimize any obstruction posed by the tailgate center rear portion 30 to the loading of material into the dump body 12 as shown in FIG. 6. Thus, the likelihood that either the loading equipment or possibly the material being loaded will inadvertently collide with, and damage, the tailgate assembly 14 is substantially reduced. In particular, unlike previous designs, when the tailgate assembly 14 of the present invention is in the out-of-service position, the center rear portion 30 of the tailgate is arranged and oriented such that it does not project or extend into the space above the open top of the dump body as shown in FIG. 6.

Figure 7:
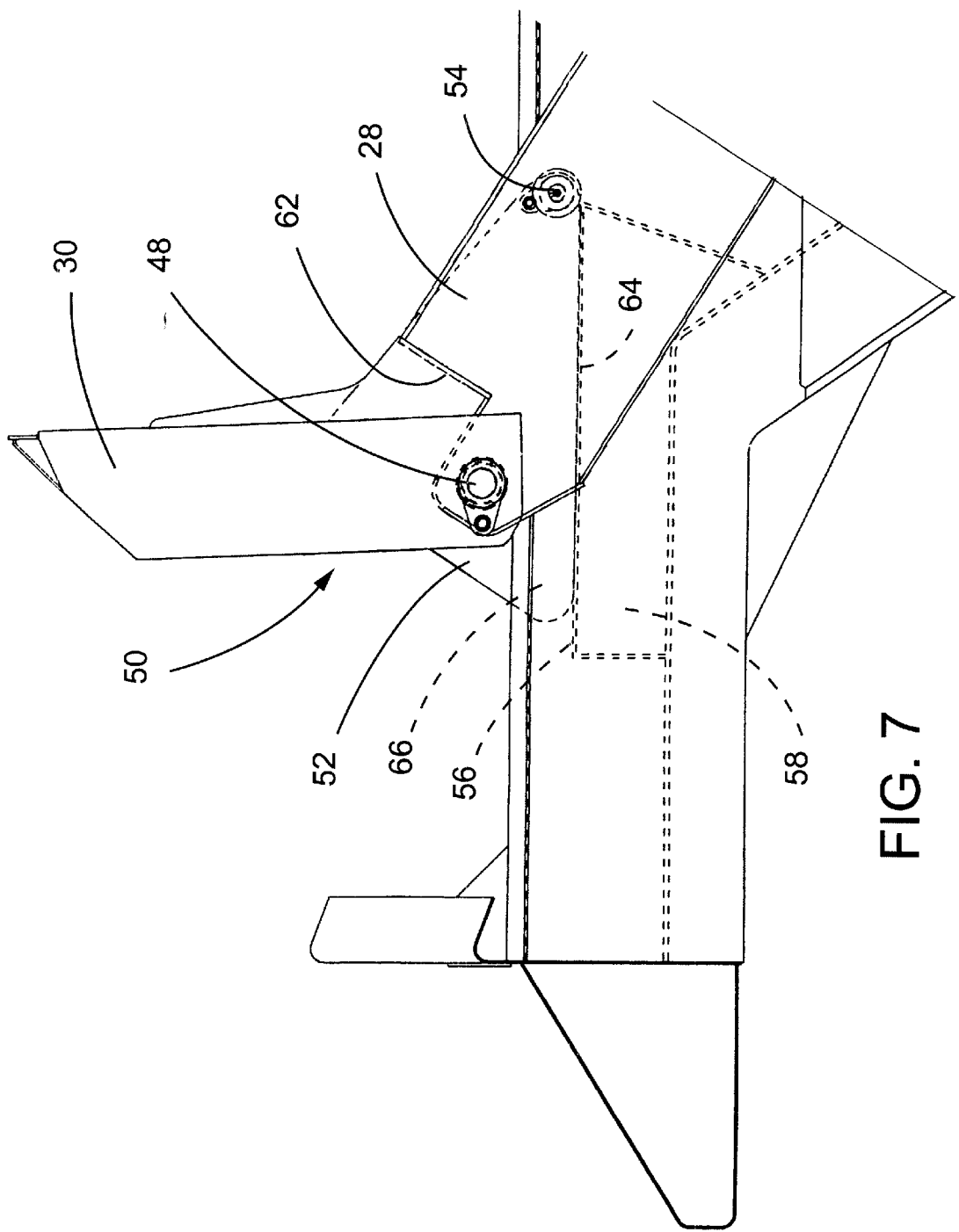
FIG. 7 is an enlarged partial side view of the heavy-duty, off-road truck of FIG. 1 showing the tailgate assembly in the out-of-service position with the center rear portion of the tailgate in the inoperative position.

To this end, the center rear portion 30 of the tailgate assembly 14 is supported between the two side beams 28 for rotation about an axis extending perpendicular to the side beams between its own respective operative (see, e.g., FIG. 1) and inoperative positions (see, e.g., FIGS. 6 and 7). In this instance, the center rear portion 30 of the tailgate is supported on a pair of pivot pins 48 each of which is received in a respective one of the side beams 28 so that the center rear portion 30 is pivotable relative to the side beams about the axis defined by the pivot pins 48. In the operative position, the center rear portion 30 of the tailgate is oriented such that when the tailgate assembly 14 is in the in-service, closed position the center rear portion closes off the rear end of the dump body 12 as shown in FIG. 1. In the inoperative position, the center rear portion 30 of the tailgate is pivoted with respect to the tailgate side beams 28 such that the center rear portion will not overhang the open top of the dump body 12 when the tailgate assembly is in the out-of-service position as shown in FIG. 6.

To move the center rear portion 30 of the tailgate between the operative and inoperative positions, the tailgate includes a pivoting assembly 50 which actuates as the tailgate assembly rotates between the in-service and out-of-service positions. In the illustrated embodiment, the pivoting assembly includes a heel portion 52 which is fixed to the center rear portion 30 of the tailgate. As the tailgate assembly 14 approaches the full out-of-service position (FIGS. 3 and 4), a cam roller 54 on the end of the heel portion 52 engages a complementary cam surface 56 on a seat 58 arranged, in this case, on the interior surface of the side wall 20 of the dump body 12 adjacent the canopy 26. As the tailgate assembly 14 continues to rotate, the movement of the cam roller 54 over the seat 58 caused by rotation of the tailgate assembly 14 towards the full out-of-service position produces a torque on the hinged center rear portion 30 of the tailgate. This torque rotates or pivots the center rear portion 30, in a counter-clockwise direction with respect to the drawings, away from the open top of the dump body 12 into the inoperative position (FIGS. 5–7). Similarly, when the tailgate assembly 14 rotates from the out-of-service position back to the in-service position, the movement of the cam roller 54 over the cam surface 56 on the seat 58 permits the weight of the center rear portion 30 to pivot it back into the operative position in a controlled manner.

Once the tailgate assembly 14 reaches the in-service, closed position (FIG. 1), the center rear portion 30 is held in place by a holding mechanism comprising, in this case, seats 60 (FIGS. 8 and 9) arranged at the rear end of the dump body 12 which engage the center rear portion 30 and prevent it from pivoting outward.

Figure 8:
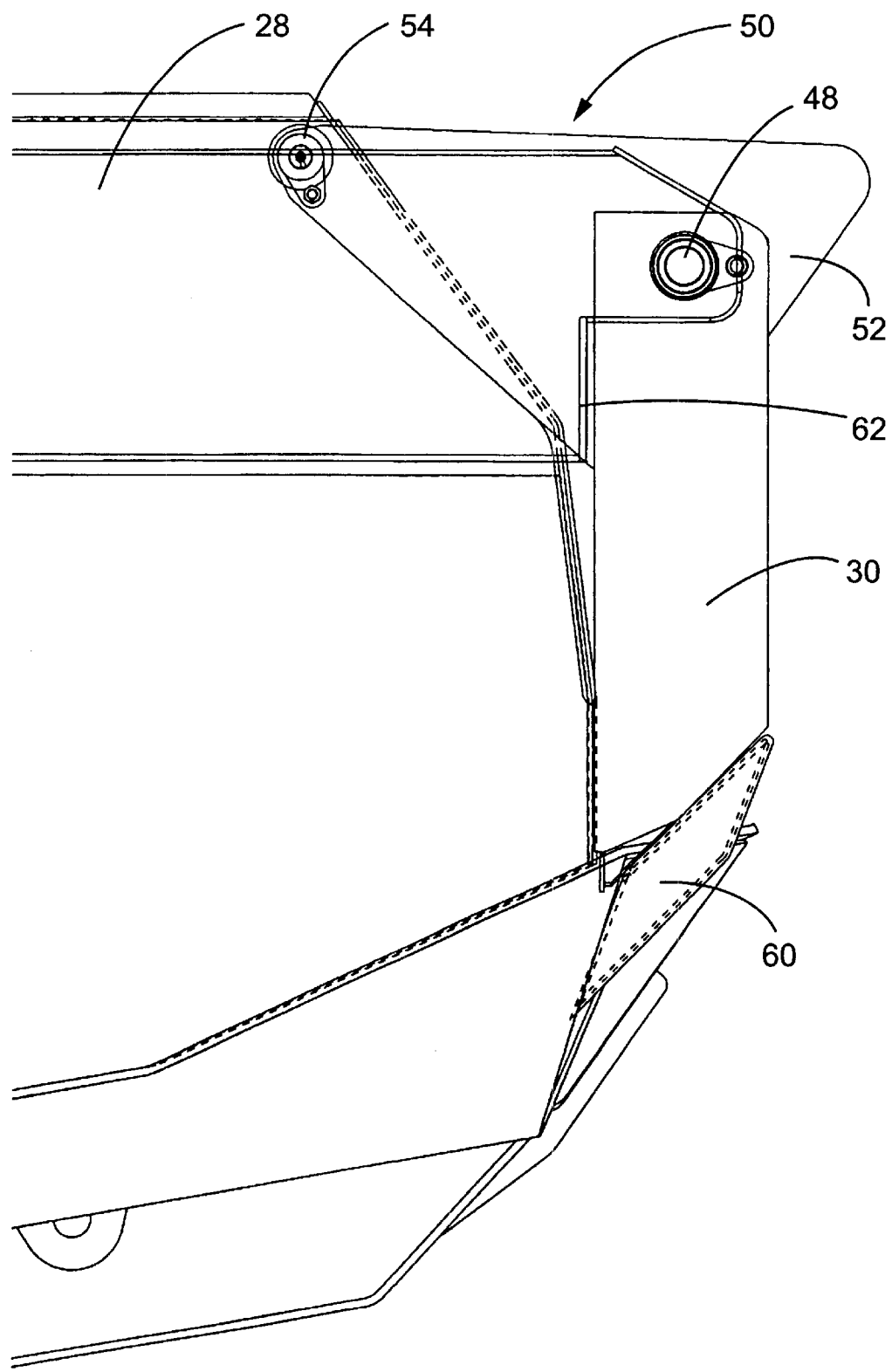
FIG. 8 is an enlarged partial side view of the heavy-duty, off-road truck of FIG. 1 showing the tailgate assembly in the in-service, closed position with the center rear portion of the tailgate secured in the operative position.
Figure 9:
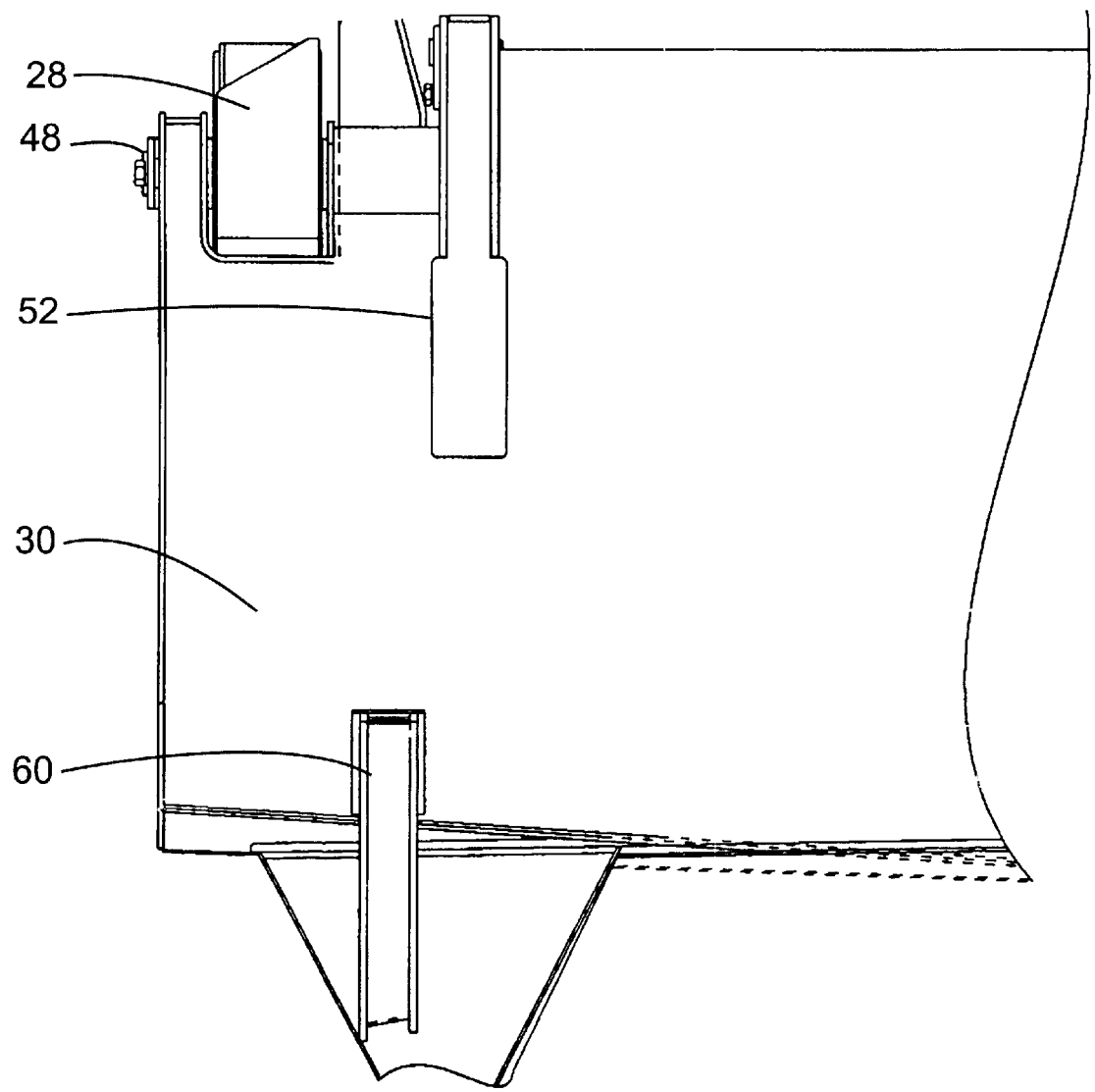
FIG. 9 is an enlarged partial rear end view of the heavy-duty, off-road truck of FIG. 1 showing the tailgate assembly in the in-service, closed position and the center rear portion of the tailgate secured in the operative position.

To ensure that the center rear portion 30 of the tailgate rotates properly between the operative and inoperative positions, the tailgate assembly 14 includes elements which limit the range of movement of the center rear portion 30 relative to the tailgate side beams 28 as the tailgate assembly moves between the in-service and out-of-service positions. More specifically, in the illustrated embodiment, a stop 62 is provided adjacent the free end of the tailgate side beam 28 which limits clockwise (with reference to the drawings) pivoting movement of the center rear portion 30. Thus, as the tailgate assembly 14 moves between the in-service and out-of-service positions, the stop 62 prevents the weight of the center rear portion 30 from causing it to rotate out of the operative position as shown in FIGS. 2 and 3. By preventing such rotation, the stop 62 ensures that the cam roller 54 will properly engage the cam surface 56 on the seat 58 as the tailgate assembly 14 approaches the out-of-service position (FIGS. 3 and 4) and that the center rear portion will be in the operative position when the tailgate assembly reaches the in-service, closed position (FIGS. 1 and 8).

Additionally, in the illustrated embodiment, the heel portion 52 is configured so as to include an edge defining a stop surface 64 which engages the cam surface 56 (see, e.g., FIGS. 4 and 7) when the center rear portion 30 reaches the inoperative position. The stop surface 64 on the heel portion 52 further includes an extended portion 66 on the opposing side of the tailgate pivot axis (defined by the pivot pins 48) from the cam roller 54 which limits counterclockwise rotation of the center rear portion 30 past the inoperative position. Thus, the extended portion 66 of the stop surface 64 prevents the center rear portion 30 from over-rotating past the inoperative position and into an orientation in which it cannot rotate back into the operative position as the tailgate assembly 14 moves back to the in-service position. Additionally, the pressure in the actuating cylinder 40 prevents the center rear portion 30 from inadvertently rotating back into the operative position.

Figure 10:
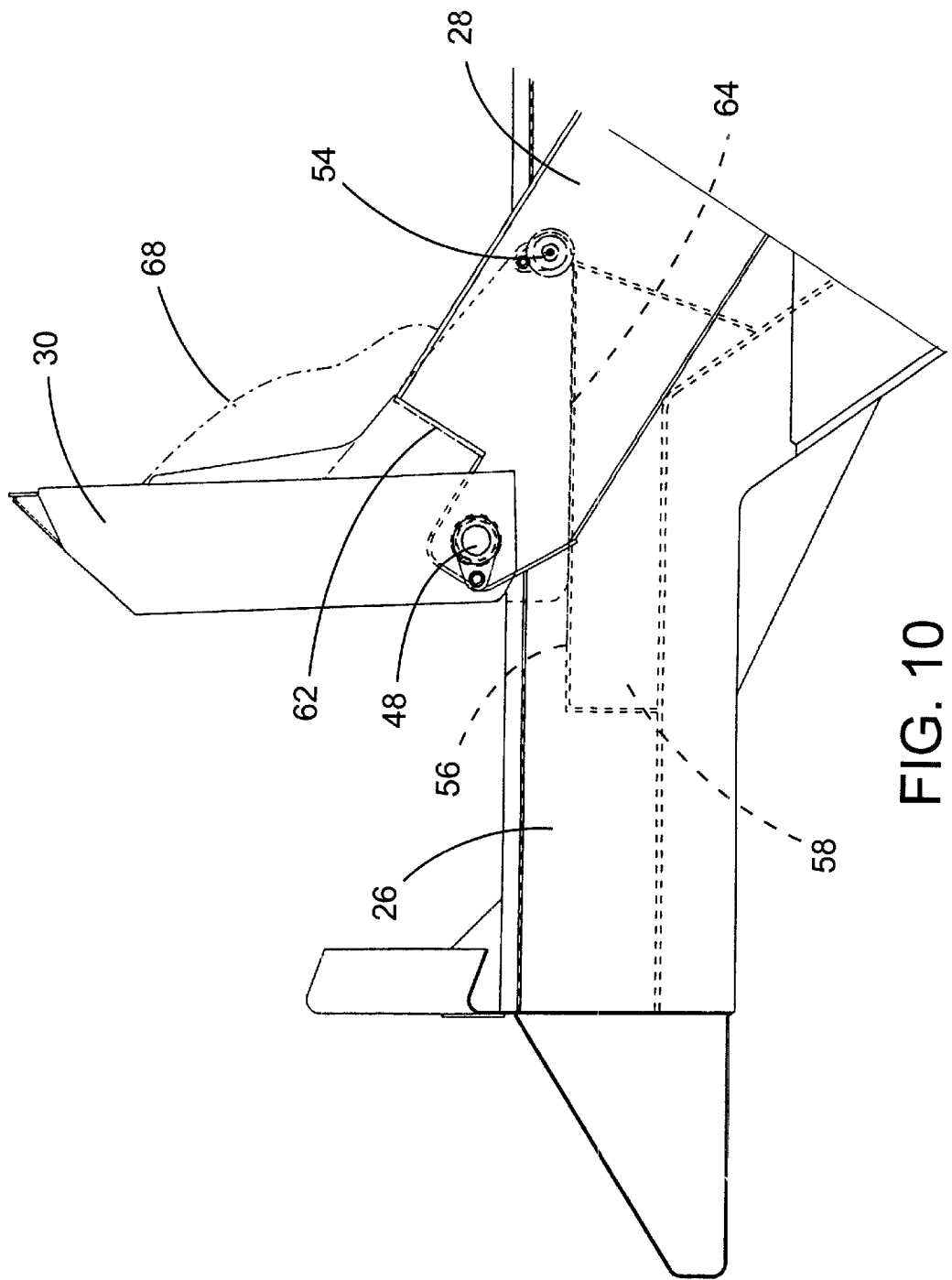
FIG. 10 is an enlarged partial side view of an alternative embodiment of the present invention showing the dump body in the lowered position and the tailgate assembly in the out-of-service position with the center rear portion of the tailgate in its inoperative position.

In an alternative embodiment, a cable, chain 68 or the like can be used to limit counterclockwise rotation of the center rear portion 30 as opposed to providing an extended portion 66 of the stop surface 64 on the opposing side of the center rear portion's pivot axis from the cam roller 54. As shown in FIG. 10, the cable or chain 68 is attached at one end to the tailgate side beam 28 and at the opposing end to the center rear portion 30. As will be appreciated, the chain or cable 68 is of a suitable length so as to allow the center rear portion 30 to rotate to the inoperative position while preventing it from rotating too far in the counterclockwise direction. Moreover, the chain or cable 68 provides the additional advantage that it can be designed to break if the loading equipment collides with the center rear portion during a loading operation. This allows the center rear portion to pivot counterclockwise thereby helping to lessen some of the force of the collision, preventing more serious damage to the tailgate assembly.

From the foregoing it can be seen that a selectively deployable tailgate assembly is provided which includes a pivotable center rear portion of the tailgate and a relatively simple and reliable mechanism for automatically pivoting the center rear portion of the tailgate into an inoperative position as the tailgate assembly rotates into the out-of-service position. When the center rear portion of the tailgate is in the inoperative position it is oriented such that it does not project into the space above the open top of the dump body and thereby minimizes obstructions to the loading of material into the dump body. Thus, the tailgate assembly of the present invention substantially reduces the risk of damage to tailgate assembly during the loading operation as compared to prior tailgate assembly designs.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A tailgate assembly for a truck body, the truck body having opposing side walls, a front wall, a floor and an open top, the assembly comprising a gate portion pivotally supported between a pair of opposing side beams for movement relative to the side beams between an operative and an inoperative position, each of the side beams being pivotally attached to a respective one of said side walls of the truck body such that the side beams and gate portion are movable relative to the truck body between an in-service, closed position wherein the gate portion encloses a rear end of the truck body and an out-of-service position wherein the gate portion is positioned adjacent a forward end of the truck body, and a pivoting assembly for moving the gate portion between the operative and inoperative positions, the pivoting assembly being actuated as the side beams carry the gate portion to the out-of-service position such that the gate portion pivots relative to the side arms toward the forward end of the truck body from the operative to the inoperative position.

2. The assembly according to claim 1 wherein the pivoting assembly pivots the gate portion from the inoperative position to the operative position as the side beams move from the out-of-service position to the in-service, closed position.

3. The assembly according to claim 1 wherein when the side beams and gate portion are in the out-of-service position and the gate portion is in the inoperative position, the gate portion is oriented so as to not extend over the open top of the truck body.

4. The assembly according to claim 1 wherein the pivoting assembly includes a cam carried by the gate portion and engageable with a corresponding cam surface so as to produce a torque which rotates the gate portion between the operative and inoperative positions.

5. The assembly according to claim 4 wherein the cam is arranged on a heel portion that is fixed to the gate portion.

6. The assembly according to claim 4 wherein the cam surface is arranged on the truck body adjacent the front wall thereof.

7. The assembly according to claim 6 wherein the cam surface is arranged on a seat disposed on one of the side walls of the truck body.

8. The assembly according to claim 1 wherein the pivoting assembly includes a stop arranged to limit pivoting of the gate portion out of the operative position as a result of gravity as the side beams carry the gate portion between the in-service, closed position and the out-of-service position.

9. The assembly according to claim 8 wherein the stop is arranged on one of the side beams.

10. The assembly according to claim 5 wherein heel portion includes a stop which engages the cam surface when the gate portion reaches the inoperative position.

11. The assembly according to claim 10 wherein the stop on the heel portion is configured to limit pivoting of the gate portion toward the forward end of the truck body past the inoperative position.

12. The assembly according to claim 10 further including a flexible connector extending between one of the side beams and the gate portion so as to limit pivoting of the gate portion toward the forward end of the truck body past the inoperative position.

13. The assembly according to claim 12 wherein the flexible connector is adapted to fracture upon the application of a predetermined force to the gate portion.

14. The assembly according to claim 1 further including a locking mechanism for preventing pivoting of the gate portion when the side beams are in the in-service, closed position.

* * * * *